(Model.)
J. C. BRANNON.
COUPLING FOR CONNECTING RODS.
No. 260,448. Patented July 4, 1882.
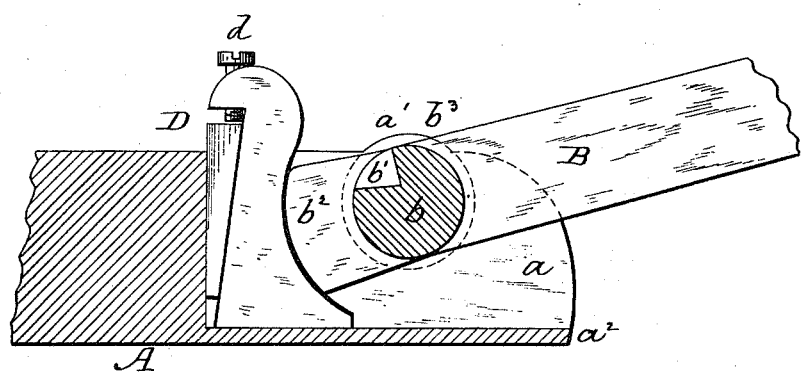
Witnesses:
E. B. Stocking
W. F. Crossman
Inventor:
Joseph C. Brannon
By [signature]
Atty.

UNITED STATES PATENT OFFICE.

JAMES C. BRANNON, OF INDEPENDENCE, KANSAS.

COUPLING FOR CONNECTING RODS.

SPECIFICATION forming part of Letters Patent No. 260,448, dated July 4, 1882.

Application filed January 24, 1882. (Model.)

*To all whom it may concern:*

Be it known that I, JAMES C. BRANNON, a citizen of the United States of America, residing at Independence, in the county of Montgomery and State of Kansas, have invented certain new and useful Improvements in Connecting-Rod Couplings; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to mechanism for detachably and adjustably connecting rods to moving parts of machinery, such as connecting rods to mower and reaper cutter-bars, to cross-heads of engines, and thills to axles in vehicles; and it consists in certain devices and combinations of devices, as hereinafter fully described, and specifically set forth in the claim.

The drawing represents in longitudinal vertical section a coupling constructed according to my invention.

A represents a portion of the moving part of any machine which is to be reciprocated by the connecting-rod B, or A may be considered as representing the thill-clip to an axle, in both cases only so much of the parts indicated being shown as is necessary to a clear understanding of my invention; and, to use a term which shall be applicable to said clip and moving part of any machine—such as the cross-head of an engine, saw-frame, or cutter-bar of a mower or reaper, or any other similar mechanism—I shall designate A as a "block."

The end of the block A is slotted at $a$ for the reception of the rod B, and perforated transversely to form bearing-surfaces fitted to the trunnions $b$ (one of which only is shown) of the rod. The slot $a$ may extend entirely through the block or partially, as shown, thus leaving a bottom, $a^2$. The bearings in block A are cut away at the top, leaving an opening in extent less than the diameter of the trunnions $b$, and the trunnions are cut away at $b'$ to allow the edges $a'$ (of the opening into the bearings) to pass within the diameter of the trunnions to the depth of the pockets $b'$, whereby the rod may be connected and disconnected with the block by withdrawing it in a curved upright line.

Removing from the trunnions a portion or pocket, $b'$, thereof reduces them in diameter to a size adapted to pass out of the openings in the bearings, which permits the entrance of one pair of the ends $a'$ of the opening into the bearing to enter the diameter of the trunnion sufficiently to allow the rotation of the rods on said ends $a'$ as a center, which construction and operation permit the connection and disconnection of the rod. When connected the rod is backed and locked in operative position by a wearing-block, C, held in place by a wedge, D, which may be adjusted by a screw, $d$, as shown. The block C presses against an extension, $b^2$, of the rod, which extension may be a partial or complete circle on its working-face.

It will be readily seen that by tightening the wedge D the moving parts are brought snugly together, and in this manner smoothness of operation and the taking up of wear are accomplished. The rod B being equal in width to the slot $a$, it bears on both sides therein, and hence a perfectly-true movement of the parts is secured and the deleterious effects of worn trunnions are overcome by said side bearings in connection with the end bearing-surface, $b^2$, and to further this advantage a cap, $b^3$, may be secured to each trunnion and overlap the outsides of the block, as shown, said cap being removed (or not, as desired) with the trunnions at $b'$.

Having described my invention and its operation, what I claim as new, and desire to secure by Letters Patent, is—

In a coupling, the block A, having openings $a'$, of less than three-fourths the diameter of its bearings, the slot $a$, closed at the bottom $a^2$, and the rod B, provided with the trunnions $b$, caps $b^3$, pockets $b'$, of a depth of more than one-fourth the diameter of the trunnions, and rear extension, $b^2$, having a circular bearing, in combination with the bearing-block C, having a curved face adapted to the extension $b^2$, a straight face adapted to the bottom $a^2$, and a rear slanted face adapted to the wedge D, supported therein by the screw $d$, substantially as shown and described.

In testimony whereof I have affixed my signature in presence of two witnesses.

J. C. BRANNON.

Witnesses:
C. M. RALSTIN,
WATSON STEWART.